United States Patent [19]
Chitre et al.

[11] Patent Number: 5,572,530
[45] Date of Patent: Nov. 5, 1996

[54] TECHNIQUE FOR EFFICIENT INTEGRATION OF INTEGRATED SERVICES DIGITAL NETWORK (ISDN) INTO SATELLITE SYSTEM

[75] Inventors: Dattakumar M. Chitre, Silver Spring; Piya S. Bhaskar, North Potomac, both of Md.

[73] Assignee: Comsat Corporation, Bethesda, Md.

[21] Appl. No.: 319,566

[22] Filed: Oct. 7, 1994

[51] Int. Cl.⁶ .................................................. H04B 7/185
[52] U.S. Cl. ......................... 370/110.1; 370/99; 370/97; 415/18.1
[58] Field of Search ............................... 370/110.1, 94.1, 370/97, 99, 104.1, 85.13; 375/8; 455/18.1, 13.1, 13.2, 98

[56] References Cited

U.S. PATENT DOCUMENTS 5,172,375  12/1992  Kou ...................................... 370/104.1
5,412,660  5/1995  Chen et al. ............................. 370/99

Primary Examiner—Douglas W. Olms
Assistant Examiner—Ajit Patel
Attorney, Agent, or Firm—Sughrue, Mion, Zinn, Macpeak & Seas

[57] ABSTRACT

An ISDN Satellite Switch (ISS) is disposed between ISDN user equipment (e.g., an ISDN PBX) and a satellite network, to extract and process the ISDN signaling information originated from the ISDN user equipment, allocate an appropriate satellite capacity for the user service request, generate signaling response messages to the originating user, generate messages to be transmitted over a satellite signaling channel to the corresponding ISS connected to the destination user, and provide an appropriate Protocol Conversion Function (PCF), when necessary for a certain class of data protocols. A destination ISS, after receipt of these messages, generates ISDN incoming call signaling messages to be sent to the called user.

11 Claims, 2 Drawing Sheets

TECHNIQUE FOR EFFICIENT INTEGRATION OF INTEGRATED SERVICES DIGITAL NETWORK (ISDN) INTO SATELLITE SYSTEM

BACKGROUND OF THE INVENTION

1. Field of the Invention

The present invention pertains to a technique which makes optimal usage of satellite resources and provides switched ISDN connections to the end users via any satellite network, at a Quality Of Service (QOS) level which is comparable to that of a terrestrial network. More specifically, the invention relates to techniques that can be implemented in a cost-effective manner while providing wideband (N×64 kbps, N=1 to 30) switched ISDN connections via a satellite network with acceptable QOS to the end-users.

2. Brief Discussion of Related Art

In an attempt to standardize digital communications links, media and interfaces, the Internation Telecommunications Union (ITU), a communications standard group that is part of the United Nations, has defined a recommendation for a worldwide Integrated Services Digital Network (ISDN) capable of handling voice and data over copper wires, fiberoptics, satellite channels and other implementations of future technologies. For example, ISDN uses a single digital transmission network to provide services such as voice, text, facsimile, videotex and video, both switched and non-switched, and both circuit-and packet-mode. ISDN services are of two types; bearer services, which provide transmission of signals between user-network interfaces, and teleservices, which include terminal equipment functions.

ISDN channels include the B channel, whose rate is 64 kbps accompanied by timing. It carries the user's information but not signaling information. The B channel may carry multiplexed information, but it is switched as a unit. The D channel primarily carries signaling information for circuit switching by the ISDN, but it may also be used for telemetering, alarm, and control information, and for packet-switched data.

These channels are combined into standard interfaces. The Basic Rate Interface (BRI) contains two B channels and one 16-kbps D channel. The B channels may be used independently, in different connections. At the primary rate of 1,544 or 2,048 kbps, a Primary Rate Interface (PRI) can be provided as 23 B channels and one 64-kbps D channel, or 30 B channels and one D channel.

It will be appreciated that ISDN interfaces are intended to support single ISDN terminals, multiple-ISDN-terminal installations, PBXs, LANs, private networks, information storage and processing centers, networks dedicated to a specific service, and other multiple-service networks, including ISDNs.

It should be noted that ISDNs are covered by ITU Recommendations in the I-series, including I.120, Description of ISDNs; I.210, Service Aspects of ISDNs; and I.340, ISDN Connection Types. Several recommendations cover user-network interfaces; I.410, General Aspects and Principles; I.411, Reference Configurations; and I.412, Interface Structures and Access Capabilities. Other aspects of ISDNs are covered by ITU Recommendations in the Q-series, as discussed in greater detail below.

Because such a system must encompass high-level data such as video images, computer messages, voice communications, and other information, and must also specify low-level data concerning wires, connectors, frequencies, voltages, etc., the system has been designed in "layers" with the bottom layer (layer 1) representing the physical phenomenon, and the top layer (layer 7) representing user applications. In between are layers that partition the network in terms of well-defined interfaces that range from the interface at the bottom (physical) layer, over which physical signals are passed, up an increasingly abstract hierarchy to the most general, "application" layer which represents the user's desired task or application that makes use of the digital (ISDN) communications network. The ITU layers are rigorously defined at the interfaces between layers, and the messages that flow between the layers are also specified. It is important to note that the implementation of the layers is not specified, leaving complete freedom to the designer of the layered communication system. In use, messages flow down from the top layers to the physical layer, across the network, and up to the "peer" layer at the destination.

While the seven-layer scheme is designed to allow any computer to communicate with any other computer, regardless of make or manufacture, the top layers are not absolutely essential to successful communications across the network. The bottom three layers, i.e., the Physical (1), Data Link (2), and Network (3) layers, are essential, and must exist where any device or system is capable of communicating across the ISDN. See U.S. Pat. No. 5,337,403 to Klingman.

Although ISDN standards have recently been developed for the provision of a multitude of services via common signaling and interface procedures, it is expected that the global infrastructure set up by ISDN will play a significant role in the communications world. Satellite communications will be part of that role.

Satellite communication networks have unique strengths. Satellite channels are agile in the sense that they can be accessed by a widely dispersed community of users. This is in contrast to terrestrial networks where the communication channels are fixed and can be accessed by only those users who are directly connected to those channels. Also, satellite channels are inherently multipoint/broadcast in nature. Thus, any earth station in the uplink beam coverage of the satellite channel can transmit signals on that channel and it can be received by all earth stations in the downlink beam coverage of that channel. However, certain data protocols degrade over satellite links when used with certain parameters and procedures.

SUMMARY OF THE INVENTION

It is an object of the present invention to provide ISDN communications via satellite, thereby combining the strengths of satellite communication with the ISDN technology.

It is a further object of this invention to provide satellite-based ISDN communications while avoiding problems of degradation characteristic of certain data protocols over satellite links.

The present invention requires the introduction of an ISDN Satellite Switch (ISS) between the ISDN user equipment (e.g., an ISDN PBX) and the satellite network. The key functions of the ISS are to extract and process the ISDN signaling information originated from the ISDN user equipment, allocate an appropriate satellite capacity for the user service request, generate signaling response messages to the originating user, generate messages to be transmitted over a satellite signaling channel to the corresponding ISS connected to the destination user, and finally to insert appropriate Protocol Conversion Function (PCF), when necessary for a certain class of data protocols. The destination ISS, after receipt of these messages, will generate ISDN incoming call signaling messages to be sent to the called user. The appropriate handshaking for the completion of the end-to-end ISDN switched connection takes place over a satellite signaling channel and the access links connecting users to the satellite network. Call release procedures take place in a similar manner, making use of the satellite resources only for the duration of the call.

The invention enables the provision of end-to-end switched ISDN bearer service calls (requiring N×64 kbps channels) via satellite communication networks in the most resource efficient manner. The resource efficiency is achieved via the integration of ISDN signaling and deploying the agile satellite channels only when and where they are required.

BRIEF DESCRIPTION OF THE DRAWINGS

The invention will be more clearly understood from the following description in conjunction with the accompanying drawings, wherein.

DESCRIPTION OF THE PREFERRED EMBODIMENTS

The technique according to the present invention is characterized by (1) the interception and processing of the ISDN user signaling information by the ISS, (2) the use of satellite resource (i.e., capacity) as a "super-concentrator in the sky" providing switched wideband ISDN connections to a geographically dispersed community of ISDN users, and (3) a protocol conversion function to be performed on selected data protocols by (i) the identification of access and network protocols during the call setup phase, (ii) the termination of the incoming protocols at the appropriate layer of the protocol architecture, (iii) the use of a satellite-oriented protocol that is optimized for satellite network characteristics, and (iv) the subsequent reintroduction of the original protocol at the destination in a manner transparent to the end user.

The efficient integration of ISDN and satellite communication network is achieved by using the powerful out-of-band ISDN signaling and by exploiting the inherent strengths of the satellite system, namely, the agility and the multipoint/broadcast nature of satellite communication channels. The ISDN signaling messages are intercepted at the earth station and processed to obtain a number of pieces of relevant information. Based on these service request messages, appropriate satellite channels are configured on a demand basis to match the service characteristics. If the user protocols for particular services are likely to degrade over a satellite channel due to delay, suitable protocol conversion functions are invoked. The technique for integrating ISDN wideband services (requiring N×64 kbps of channels) with their required signaling procedures and the demand based switching of the wideband satellite channels with appropriate invocation of the PCF, and the precise rules and procedures for an efficient integration, are features of this invention which will now be described.

Figure 1:
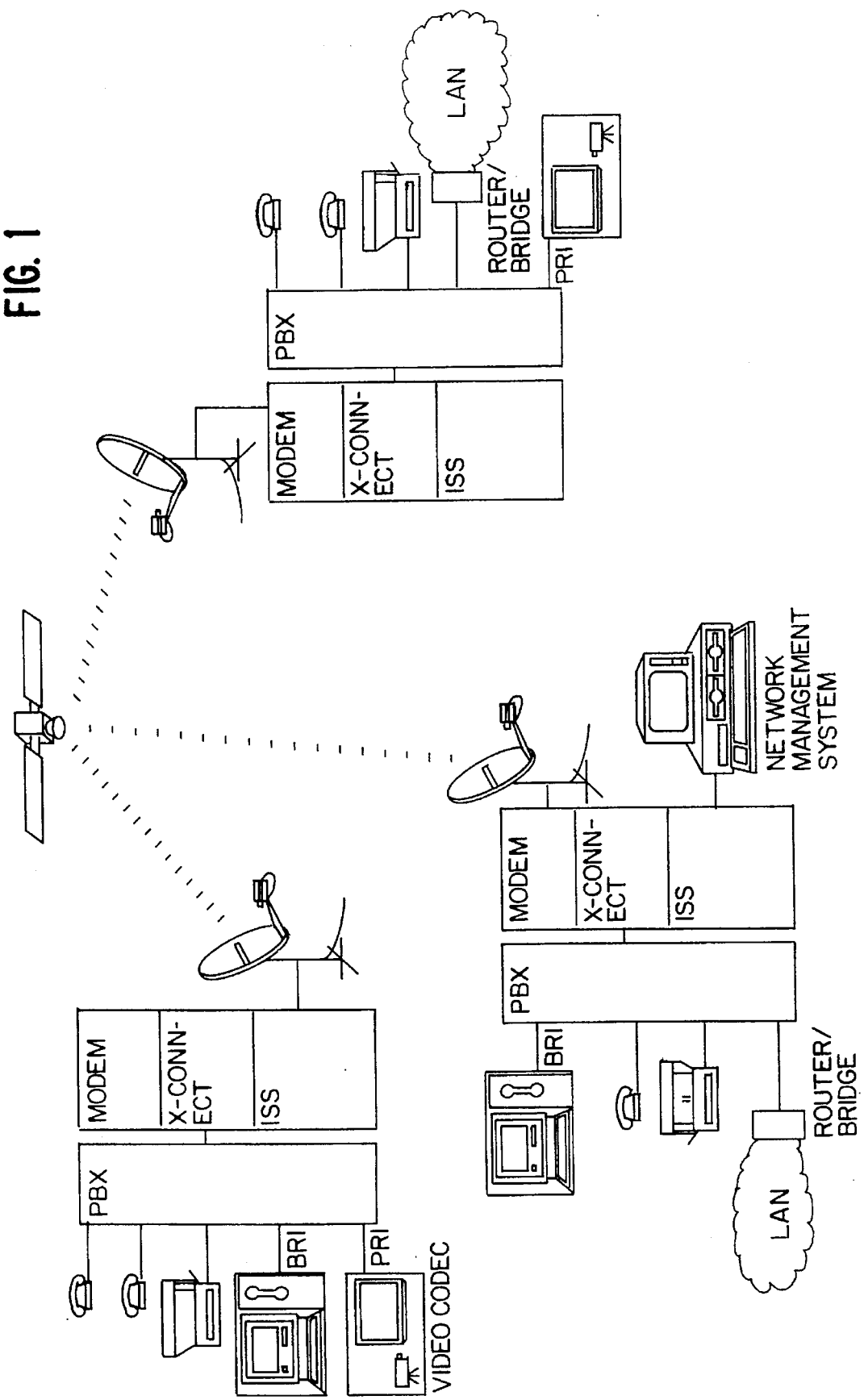
FIG. 1 is a high level block diagram which is useful in explaining the operation of the network architecture of the system according to the present invention.

One example of a network architecture of a system in accordance with the present invention is shown in FIG. 1. In this example, the user equipment, including telephones 2, facsimile machines 4, BRIs 6, PRIs 8, local area networks (LANs) 10, and PBXs 11 are directly connected to the earth stations 12, with an ISDN Satellite Switch (ISS) 14 included at each station. The ISS 14 provides the capability to create satellite ISDN networks. As shown in FIG. 1 representing an exemplary case, each earth station 12 includes the ISS 14, a modem 16 and a digital cross-connect system 18. These components cooperate so as to allow the user ISDN equipment, such as ISDN PBX 11, to be interconnected over a satellite network. From FIG. 1 it will be appreciated that the ISS is connected between the user equipment, e.g., PBX 11, and the satellite network, e.g., the generally illustrated up-link and down-link devices and the satellite itself. Advantageously, the interface to the satellite network is through the modem 16 in earth station 12. The cross-connect 18 is a piece of equipment that switches the appropriate channels of the user equipment, i.e., PBX 11, to the common modem 16. It should be noted that the control for the digital cross-connect unit 18 resides in ISS 14. Thus, ISS 14 provides ISDN signaling processing and data switching functions, advantageously with full ISDN signaling functionality provided. Satellite resources for each ISDN service call are dynamically assigned by ISS 14, with traffic from multiple users from multiple dispersed locations preferably being multiplexed into appropriate satellite resources.

The ISDN signaling messages can arrive at earth station 12a, which functions as the access into the satellite network, in either of two ways. First, the messages could come directly from the ISDN user equipment using a user-to-network signaling protocol, i.e., ITU Recommendation Q.931 (and Q.921), as described in ITU Study Group XI, Fascicle VI.11, Digital Access Signaling Systems, Network Layer, User-Network Management, Recommendations Q.930–940, Geneva, 1988. Alternatively, signaling messages could come as Signaling System No. 7 messages using the ISDN User Part (ISUP) protocol specified in ITU Recommendations Q.76x, as described in ITU Study Group XI, Fascicle VI.8, Specifications of Signaling System No. 7, Recommendations Q.721–766, Geneva, 1988. In either case, the ISDN signaling messages will be processed at the originating earth station 12a.

Figure 2:
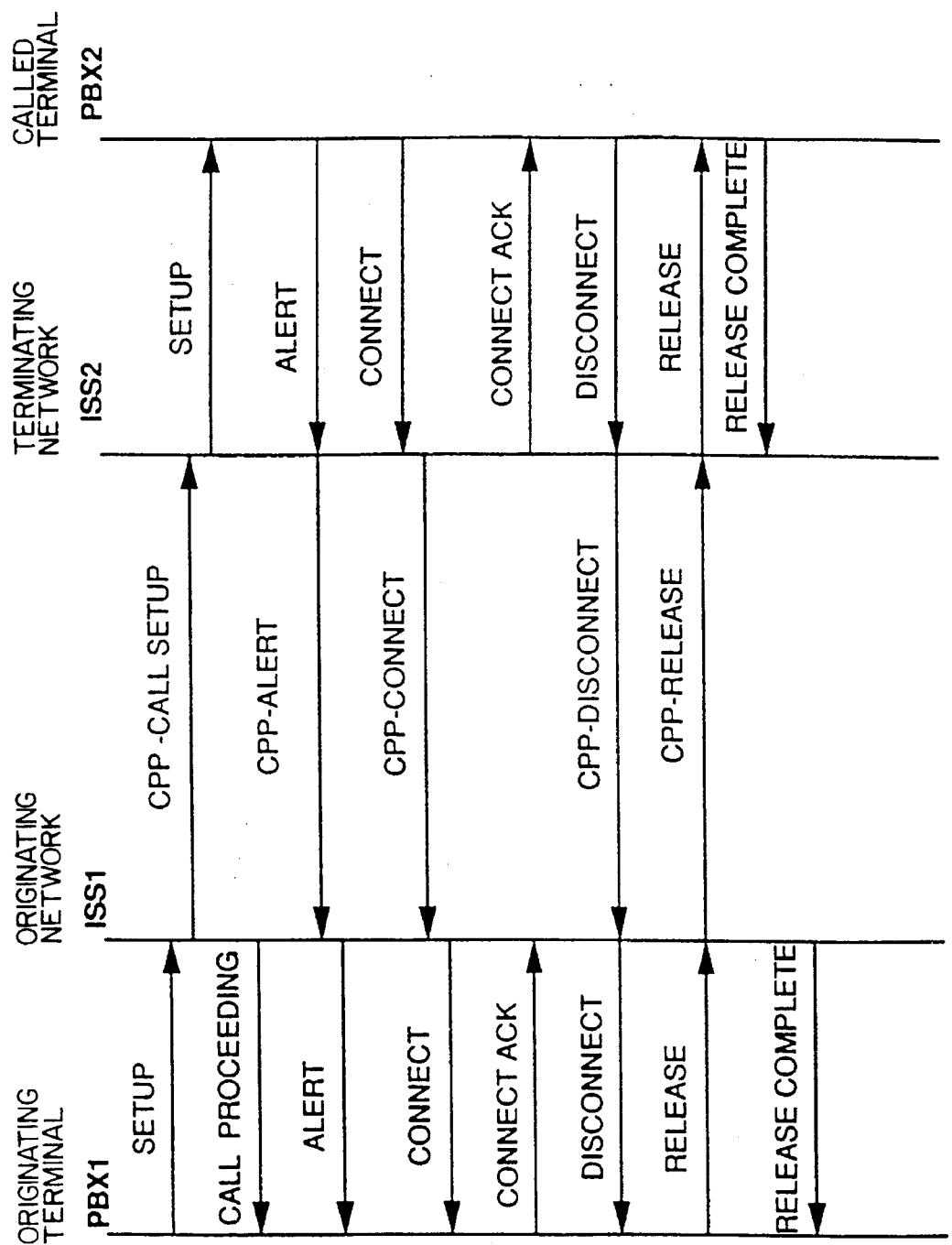
FIG. 2 is a signaling diagram which is useful in explaining the signaling messages used in the system according to the present invention.

Efficient management and switching of satellite resources is achieved by close coupling between the ISDN signaling and the internal signaling within the satellite network. An example of such an integration is shown in FIG. 2, as it applies to the network architecture illustrated in FIG. 1. In the case shown in FIG. 1, PBX1 represents the PBX at the originating or calling terminal, ISS1 indicates the ISS at the originating earth station 12a, i.e., the originating network, to which PBX1 is connected, PBX2 designating the PBX at the destination or called terminal, and ISS2 designating the ISS to which PBX2 is connected.

As shown in FIG. 2, the ISDN call SETUP message arrives at ISS1, which processes that signaling message and attempts to find an appropriate satellite resource, i.e., an available channel. It should be noted that the SETUP message is part of the standard ITU Recommendation Q.931, as previously mentioned. ISS1 generates a corresponding CPP—CALL SETUP using a proprietary protocol referred to as CPP. It should be noted that although the CPP protocol was developed in conjunction with the present invention to convey to the destination ISS2 the relevant information to set up the end-to-end call and identify the satellite resources used for the call, the CPP protocol is not part of the present invention. Thus, the CPP is COMSAT's implementation of a signaling protocol over the satellite link, which serves to carrying all of the information prescribed for standard ITU Q.931 messages. It will also be appreciated that the CPP protocol, while similar to that of Q.931 and ISUP protocols, is a protocol specific to operation of the satellite.

The ISS2, on receiving the CPP—CALL SETUP message, generates an incoming ISDN Q.931 signaling message—SETUP. Thus, a SETUP message originated by the calling party is converted by ISS1 into a CPP—CALL SETUP message for transmission over the satellite and the ISS2 receiving the CPP—CALL SETUP message generates the original SETUP message for output to the called party. In short, in response to the SETUP message produced by ISS2, the destination PBX2 sets up the call in a known manner.

The subsequent handshakes are shown in FIG. 2 running vertically down in time. The call release procedure is also shown therein. When the ISDN user requests disconnect, the satellite resource used for that call is also taken out of use through the CPP-DISCONNECT message passing.

Since the SETUP, CONNECT ACK and RELEASE commands from the originating PBX to the destination PBX, and the ALERT, CONNECT, DISCONNECT and RELEASE COMPLETE signals from the destination PBX to the originating PBX, are used in the conventional manner, further description of these signals need not be provided herein. As described above, the actual relaying of these signals over the satellite channel is performed in accordance with the CPP protocol.

The method described above uses satellite resources very efficiently due to two key procedures. The satellite resources, i.e., channels, are commonly accessible to a dispersed set of earth stations, thus each satellite acts as a "switch and multiplexer" in the sky. In addition, the ISDN signaling and switching messages are mapped into the internal signaling and switching messages required by the satellite network, e.g., the CPP protocol. It will be appreciated that the technique described above is applicable to a variety of different satellite networks such as Time Division Multiple Access (TDMA) or Frequency Division Multiple Access (FDMA) networks, with either centralized or distributed controllers.

It should further be noted that the implementation of the invention described here provides a platform which advantageously can be used for a number of applications, such as data protocol conversion functions and frame relay congestion control.

With the above discussion in mind, the salient features of the Protocol Conversion Function (PCF) will now be described.

The PCF consists of internal network procedures necessary for efficient and transparent service provision when connections include protocols which are adversely affected by the characteristics of the satellite link. The PCF will be essential in a number of (but not all) scenarios to counteract the effects of the long propagation delay incurred over a satellite link. Essentially, packet mode bearer services and certain teleservices that use packet protocols over bearer circuits may suffer general performance degradation because of the long propagation delay introduced by the satellite system. The performance degradation results mainly from the use of protocol parameters, either negotiated or default, which are less than optimum for operation in a satellite environment. In certain cases, the use of a go-back-N ARQ (Automatic Repeat Request) mechanism may also be inefficient for the satellite environment.

The PCF is needed because it is expected that, in most instances, the user will select default values of protocol parameters, which typically are not suitable for satellite links. In some cases, these protocols are not even designed to provide marginal performance in a satellite channel even when the most optimal parameters are selected. An example of this is the sequence numbering in the ITU X.25 protocols.

The protocols which are to be delay compensated can be classified as user terminal related or network related. In a user terminal related protocol, the protocol parameters have end-to-end significance, whereas the network related protocols have parameters that are network protocol specific. Examples where the parameters are associated with the user terminal are frame relay and teleservices based on circuit mode bearer services for data transfer (e.g., T.90). Examples where network related parameters need compensation are X.25 and X.75 packet switching, interworking protocols (e.g., X.221/1.530 and X.231/1.540) and teleservices using packet mode bearer services for data transfer.

As an example of the need for such PCF functionality for a user terminal related protocol, consider the case of Group 4 Facsimile as specified in T.90. In this case, the end-to-end (access) protocols involved are ISO 8208 at the network layer and X.75 (SLP) at the link layer. At the frame level, the default parameters are a 128 byte packet size, a modulo 8 based sequence number, and a k parameter, i.e., number of outstanding unacknowledged frames, of 7. In accordance with the present invention, at the originating earth station these layer-2 and layer-3 protocols are terminated and replaced by a satellite-optimized protocol at the link layer. At the destination earth station, i.e., on egress from the satellite network, the original protocols are reintroduced in a manner transparent to the end user. Thus, the end-to-end access protocols ISO 8208 at the network layer and X.75 at the link layer for Group 4 Facsimile are reinserted into the data stream.

The identification of in-band (user) communications protocols that experience degradation is limited to those protocols which are identified by the Digital Subscriber Signalling No. 1 (DSS-1) information elements and corresponding Signaling System (SS) No. 7 parameters into which they are mapped. In will be appreciated that the DSS-1 information elements are the subsets of messages that constitute the predetermined protocol. Some information elements are mandatory in the messages while others are optional. Bearer capability, calling party number, channel identification, higher-layer compatibility are examples of these information elements. Currently, the ITU Recommendations identify the layer-2/layer-3 of the user protocols in the Q.931 SETUP message (of DSS-1) and in the corresponding ISDN-UP (ISUP) initial address message (IAM) message. These user protocols are specified within certain parameters in the IAM message, based on information elements mapped from the Q.931 SETUP message.

In particular, the Transmission Medium Requirement (TMR) contains information about the connection type to be supported. The Access Transport (AT) contains the Lower Layer Compatibility (LLC) information element of the Q.931 SETUP message, which specifies the layer-1, layer-2, and layer-3 protocols used. The User Service Information (USI) contains the Bearer Capability (BC) information element of the Q.931 SETUP message, which specifies the requested bearer service to be provided by the network. If these parameters are passed to the satellite subnetwork, protocol conversion can be performed on those identified protocols which experience degradation on a satellite channel, i.e., T.90, X.25, X.75 and HDLC protocols. For an exemplary case regarding the identification of end-to-end protocols, the LLC information element is carried by the IAM. It will be noted that when this is not the case, then the end-to-end protocols will not be identifiable by the satellite subnetwork.

The following parameters may cause a communications protocol to experience degradation on a satellite link:
- sequence numbering and window size;
- the k parameter, ie., the number of outstanding unacknowledged frames);
- timer values;
- frame size;
- congestion control scheme; and
- error recovery mechanism, e.g., ARQ.

In some instances, parameters such as window size may be set to values which are not suitable for the propagation delay inherent in a satellite link, which could occur if, for example, default parameter settings are used. In other cases, the parameters may not be able to assume the needed values for transmission over satellite links. For instance, a packet header may only provide for as few as 8 (3 bit) sequence numbers, whereas to achieve efficient throughput a satellite network may need a much larger sequence number. Graceful performance degradation as burst error rate (BER) deteriorates is also a critical requirement in designing the satellite efficient protocol at the link layer. For example, a go-back-N class protocol such as LAP-B performs very poorly when the BER degrades. Furthermore, congestion in the network may result in dropped traffic. Consequently, the provision of error free satellite links will not necessarily compensate for the poor performance of the go-back-N mechanism over paths with long propagation delays, since errors and congestion can occur outside the satellite subnetwork.

One possible solution to the problems associated with BER degradation is to allocate a better channel for an error sensitive protocol and avoid protocol conversion. For example, a particular TDMA channel could improve the BER. This is not likely to be a viable solution, however, because as discussed above, most protocols which are error sensitive are likely to contain other parameters not suitable for long propagation delays and, thus, would experience unacceptable degradation even on an error free channel.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A satellite-based Integrated Services Digital Network (ISDN) communications system, comprising:

a satellite having associated satellite channels;

source and destination earth stations for communicating with one another over selected said satellite channels;

originating equipment for generating ISDN signaling messages and bearer traffic supported by ISDN;

destination equipment for receiving said ISDN signaling messages and said bearer traffic;

a source ISDN Satellite Switch (ISS) responsive to said ISDN signaling messages for generating resource messages having a predetermined first protocol and, responsive to received said bearer traffic from said originating equipment, for providing a protocol conversion function to thereby convert selected said received bearer traffic from a predetermined second protocol to a predetermined third protocol representing converted data, so as to permit transmission of said resource messages and said converted data from said source earth station to said destination earth station over one of said satellite channels; and a destination ISS responsive to said resource messages received at said destination earth station via one of said satellite channels for regenerating said ISDN signaling messages for transmission to said destination equipment and for reconverting said converted data from said third protocol to said second protocol.

2. The satellite-based ISDN communications system according to claim 1, wherein said source ISS is responsive to signalling from said originating equipment for allocating an available one of said satellite channels to a call from said originating equipment on a demand assignment basis.

3. The satellite-based ISDN communications system according to claim 1, wherein said source ISS generates signaling response messages to said originating equipment.

4. The satellite-based ISDN communications system according to claim 1, wherein said satellite channels include at least one dedicated signaling channel and a plurality of communication channels, with handshaking signaling for setting up a connection over one of said communication channels between said originating and destination equipments being exchanged over said dedicated signaling channel.

5. The satellite-based ISDN communications system according to claim 1, wherein at least one of said resource messages specifies said second and said third protocols.

6. The satellite-based ISDN communications system according to claim 1, wherein said ISDN communications provides services including voice, text, facsimile, videotext and video, and wherein said originating ISS configures an appropriate one of said satellite channels for a particular service requested.

7. The satellite-based ISDN communications system according to claim 1, wherein said originating ISS multiplexes said resource messages from multiple source equipments onto a single satellite channel.

8. In an Integrated Services Digital Network (ISDN) system having channel equipment for establishing a communications channel connecting originating equipment for generating ISDN signaling messages and digital data with destination equipment receiving said ISDN signaling messages and said digital data, said channel equipment comprising:

first means receiving and transmitting said ISDN signalling messages for generating resource messages in a first protocol matched to said communications channel and receiving said digital data for converting and transmitting said digital data received in a predetermined second protocol to transmission data in a predetermined third protocol, wherein said third protocol is selected so as to minimize transmission data degradation during transmission via said communications channel; and second means operatively connected to said first means for regenerating said ISDN signalling messages for transmission to said destination equipment responsive to receipt of said resource messages and for reconverting said transmitted data from said third protocol to said second protocol.

9. The ISDN communications channel equipment according to claim 8, wherein said second means generates signaling response messages routed to the originating equipment via said first means.

10. The ISDN communications channel equipment according to claim 8, wherein said first means multiplexes said resource messages from multiple source equipments onto one said communication channel.

11. The ISDN communications channel equipment according to claim 8, wherein at least one of said resource messages specifies said second and said third protocols.

* * * * *